(12) United States Patent
Radhakrishnan et al.

(10) Patent No.: US 9,115,608 B2
(45) Date of Patent: Aug. 25, 2015

(54) VALVE LASH ADJUSTMENT SYSTEM

(71) Applicant: Caterpillar Inc., Peoria, IL (US)

(72) Inventors: Anupam Radhakrishnan, Normal, IL (US); Rajesh Sampath, Chennai (IN); Sivakumar Ramaiyan, Chennai (IN); John A. Jordan, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/305,024

(22) Filed: Jun. 16, 2014

(65) Prior Publication Data

US 2014/0290609 A1 Oct. 2, 2014

(51) Int. Cl.
*F01L 1/18* (2006.01)
*F01L 1/20* (2006.01)
*G01B 5/00* (2006.01)

(52) U.S. Cl.
CPC ... *F01L 1/18* (2013.01); *F01L 1/20* (2013.01); *G01B 5/0032* (2013.01); *F01L 2103/01* (2013.01)

(58) Field of Classification Search
CPC ........... F01L 1/18; F01L 1/20; F01L 2103/01; G01B 5/0032

USPC ............................................ 123/90.45, 90.43
See application file for complete search history.

(56) References Cited

U.S. PATENT DOCUMENTS

| | | | |
|---|---|---|---|
| 3,988,925 A | 11/1976 | Seccombe et al. | |
| 4,521,863 A | 6/1985 | Solaroli | |
| 6,205,850 B1 * | 3/2001 | Wehrman et al. | 73/114.79 |
| 7,114,230 B2 | 10/2006 | Batchelor et al. | |
| 7,559,301 B2 | 7/2009 | Hathaway | |
| 7,587,932 B2 | 9/2009 | Kriener et al. | |
| 8,316,699 B2 | 11/2012 | Sueoka et al. | |

* cited by examiner

*Primary Examiner* — Zelalem Eshete

(57) ABSTRACT

A valve lash adjustment system for setting a valve to a rocker arm clearance for a valve train associated with a particular combustion cylinder for an engine is disclosed. The valve lash adjustment system includes a frame assembly including an engine head attachment portion and an instrument attachment portion. The engine head attachment portion of the valve lash adjustment system is removably attachable to the engine and the instrument attachment portion is selectively positionable relative to the engine head attachment portion. The valve lash adjustment system also includes an instrument assembly including at least one position sensor and at least one display unit. The valve lash adjustment system further includes a gap setting gauge assembly having a clip member.

2 Claims, 4 Drawing Sheets

VALVE LASH ADJUSTMENT SYSTEM

TECHNICAL FIELD

The present disclosure relates to a tool, and more particularly to an adjustment tool for setting a valve lash associated with a valve train.

BACKGROUND

Internal Combustion (IC) engines such as a four-stroke IC engine include a valve train for operation of valves that control timing and quantity of gas flow into cylinders and removal of exhaust products therefrom. The valves are generally opened and closed by a camshaft that is synchronized to the crankshaft by a chain, belt, or gear. The camshaft actuates a valve lifter which in turn actuates the valve stem through a push rod and rocker arm.

A clearance or gap referred to as valve lash is provided between the rocker arm and the valve stem. This valve lash may need to be optimally adjusted so as to operate the engine at high performance. However, the valve lash may change and needs to be reset after certain hours of operation of the engine. The time interval to check the valve lash is generally mentioned in the service manuals of each engine, published by their respective OEMs. Accordingly, there is a need to adjust the valve lash periodically.

Valve lash measurement is generally done using manual methods, wherein feeler gauges are utilized to measure the valve lash and accordingly adjust the valve lash by tightening or loosening of a screw of the rocker arm. However, this process is laborious, time consuming and prone to minute errors, due to accessibility and repeatability issues on the engine valves.

U.S. Pat. No. 8,316,699 discloses a method and a device for measuring and adjusting a valve clearance value to a desired value in an engine having a rocker-arm-type valve. The method described in '699 patent is cumbersome as a center-to-center distance between ball-ends of the measuring probes is measured, and a valve lash is determined based on the known values of probes diameter and measured value of center-to-center distance. The holding means, moving means, and driving means of the probes, adds cost to the measuring equipment. Also, the calculations required to determine the center-to-center distance is time consuming. Moreover, it is common to repeatedly check the center-to-center distance prior to achieving the final valve lash, which is tedious and undesirable.

Therefore, the present disclosure may overcome one or more of the deficiencies provided by the background references.

SUMMARY OF THE DISCLOSURE

In one aspect of the present disclosure, a valve lash adjustment system for setting a valve to a rocker arm clearance for a valve train associated with a particular combustion cylinder for an engine is disclosed. The valve lash adjustment system includes a frame assembly including an engine head attachment portion and an instrument attachment portion. The engine head attachment portion of the valve lash adjustment system is removably attachable to the engine and the instrument attachment portion is selectively positionable relative to the engine head attachment portion of the frame assembly. The valve lash adjustment system also includes an instrument assembly including at least one position sensor and at least one display unit. The at least one position sensor is attached to the engine head attachment portion of the frame assembly and the at least one display unit is attached to the instrument attachment portion of the frame assembly. The valve lash adjustment system further includes a gap setting gauge assembly having a clip member. The clip member has a first end and a second end, wherein the first end of the clip is configured to be selectively disposed between the valve and the rocker arm, the second end of the clip member is resiliently attached to the frame assembly. Further, the frame assembly, the instrument assembly and the gap setting gauge assembly define one detachable unit structured and arranged to attach to a head of the engine. The instrument attachment portion of the frame assembly is structured and arranged to be selectively moveable in response to a readout event of the at least one display unit In another aspect of the present disclosure, a kit for measuring and adjusting a valve lash of a valve train associated with a combustion engine is disclosed. The kit includes a valve lash tool configured to be connected to a first end of a rocker arm of the valve train. The valve lash tool includes a frame assembly. Further, the frame assembly includes an engine head attachment portion. The engine head attachment portion includes a base frame having mechanical fasteners thereon. The mechanical fasteners are configured to removably affix the base frame to a head of the engine. The engine head attachment portion also includes a first pair of support members extending axially from the base frame. The engine head attachment portion further includes a horizontal frame member attached to the first pair of support members, wherein the horizontal frame member, the first pair of support members and the base frame define a space therebetween, such that the valve train is configured to be received into the space. The frame assembly includes an instrument attachment portion attached to the engine head attachment portion. The instrument attachment portion is configured to be selectively moveable with respect to the engine head attachment portion. The instrument attachment portion includes a second pair of support members attached to the horizontal frame member and extending axially therefrom. The frame assembly also includes a gap setting gauge assembly connected to the frame assembly. The gap setting gauge assembly includes at least one clip, wherein the at least one clip has a first end having a U-shaped cut-out portion, such that the first end is configured to be selectively disposed about the rocker arm. The frame assembly also includes an instrument assembly connected to the frame assembly. The instrument assembly includes at least one position sensor attached to the horizontal frame member of the engine head attachment portion. The at least one position sensor is associated with the at least one clip, and is configured to contact with a valve present within the rocker arm. The instrument assembly also includes at least one display unit attached to the second pair of support members of the instrument attachment portion. The at least one display unit is associated with the at least one clip, wherein the at least one display unit is configured to provide a readout of the valve lash associated with the rocker arm. The kit also includes a torque wrench configured to be attached to a second end of the rocker arm, the torque wrench having an adaptor thereon. The kit further includes a hex key configured to be connected to the adaptor of the torque wrench, wherein the valve lash is adjusted based on a torque applied on the torque wrench and the hex key.

Other features and aspects of this disclosure will be apparent from the following description and the accompanying drawings.

DETAILED DESCRIPTION

Figure 1:
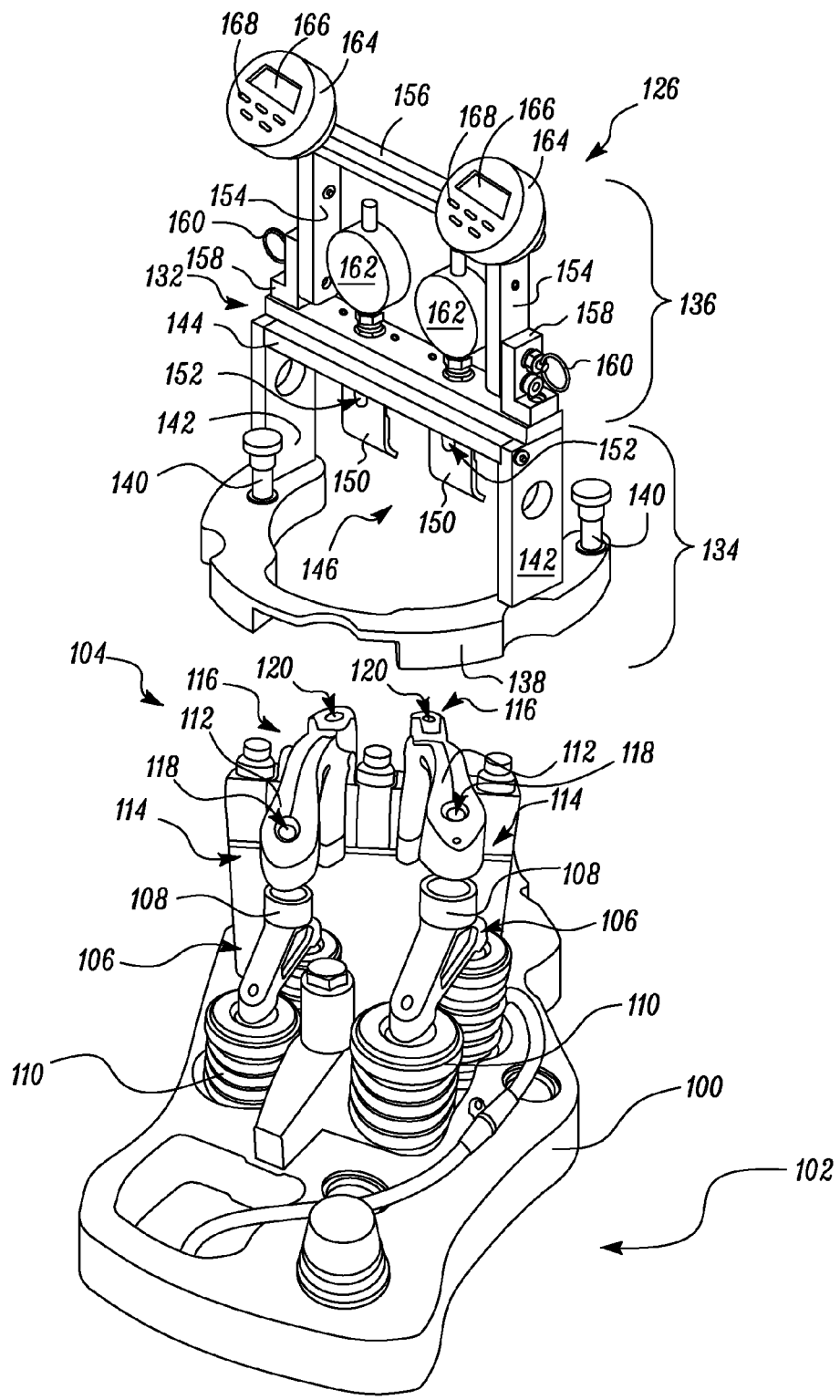
FIG. 1 is an exploded view showing a valve lash adjustment tool and a portion of valve train assembled over a cylinder head of an exemplary engine, according to one embodiment of the present disclosure.

Wherever possible, the same reference numbers will be used throughout the drawings to refer to the same or the like parts. FIG. 1 illustrates a portion of a cylinder head 100 of an exemplary engine 102. In one embodiment, the engine 102 includes a diesel powered engine. In other embodiments, the engine 102 may include any Internal Combustion (IC) engine known in the art including, but not limited to, a gasoline powered engine, a natural gas powered engine or a combination thereof. The engine 102 includes an engine housing. The engine housing includes the cylinder head 100 and a cylinder block (not shown). The cylinder block may include a plurality of cylinders (not shown).

Further, a valve train 104 is associated with the engine 102. The valve train 104 may include at least a valve 106, for example, an intake valve or an exhaust valve. The intake and exhaust valves may be configured to open and close an intake port (not shown) and an exhaust port (not shown) of the cylinders respectively, in order to control air and gas flow into and out of the cylinders, thereby facilitating combustion. The valves 106 disclosed herein may be known valve, for example, a poppet valve. The valve 106 may include a valve stem 108 and a valve spring 110. The valve 106 is retained normally in the closed position by means of the valve spring 110.

The valve train 104 also includes a camshaft (not shown), a tappet (not shown), a push-rod (not shown) and a rocker arm 112. The camshaft may be disposed within the cylinder head 100 of the engine 102. Alternatively, the camshaft may be disposed within the cylinder block of the engine 102. The camshaft may be configured to operate the tappet of the valve train 104, followed by the push rod, the rocker arm 112, the valve stem 108, and thereafter the valves 106.

As shown in the accompanying figures, a pair of the rocker arms 112 may be associated with the valves 106. The rocker arm 112 has a first end 114 and a second end 116. The first end 114 of the rocker arm 112 is free to oscillate and depress the valve stem 108 when the push rod is actuated by the tappet and the camshaft. Each of the first and second ends 114, 116 of the rocker arm 112 include through holes 118, 120 provided therein. The through hole 120 at the second end 116 of the rocker arm 112 is configured to receive an adjustment screw (not shown). The adjustment screw has a ball end (not shown) which cooperates with a ball socket (not shown) in the push rod, such that the rocker arm 112 may pivot about the push rod. Alternatively, the rocker arm 112 may have a central axis for pivoting, such that one end of the rocker arm 112 may rest on the push rod and another end of the rocker arm 112 may rest on the valve stem 108. The adjustment screw is threadably engaged in the rocker arm 112 and is provided with an adjustment locknut 124.

It should be noted that a clearance or gap is provided between the rocker arm 112 and the valve stem 108 of the valve train 104. The clearance is referred to as a valve lash. The valve lash is provided in order to accommodate thermal expansion of the rocker arm 112 and the valve stem 108 when the engine 102 heats up. Accordingly, there arises a need to reset the valve lash, for a proper functionality of the valve train 104. For this purpose, a valve lash adjustment system is disclosed herein. The valve lash adjustment system includes a valve lash adjustment tool 126 hereinafter referred as valve lash tool 126, a torque wrench 128 and a hex key 130, the structure and working of which will be explained later in this section. As shown in the accompanying figures, the valve lash tool 126 is configured to be attached to a top portion of the cylinder head 100 of the engine 102.

Figure 2:
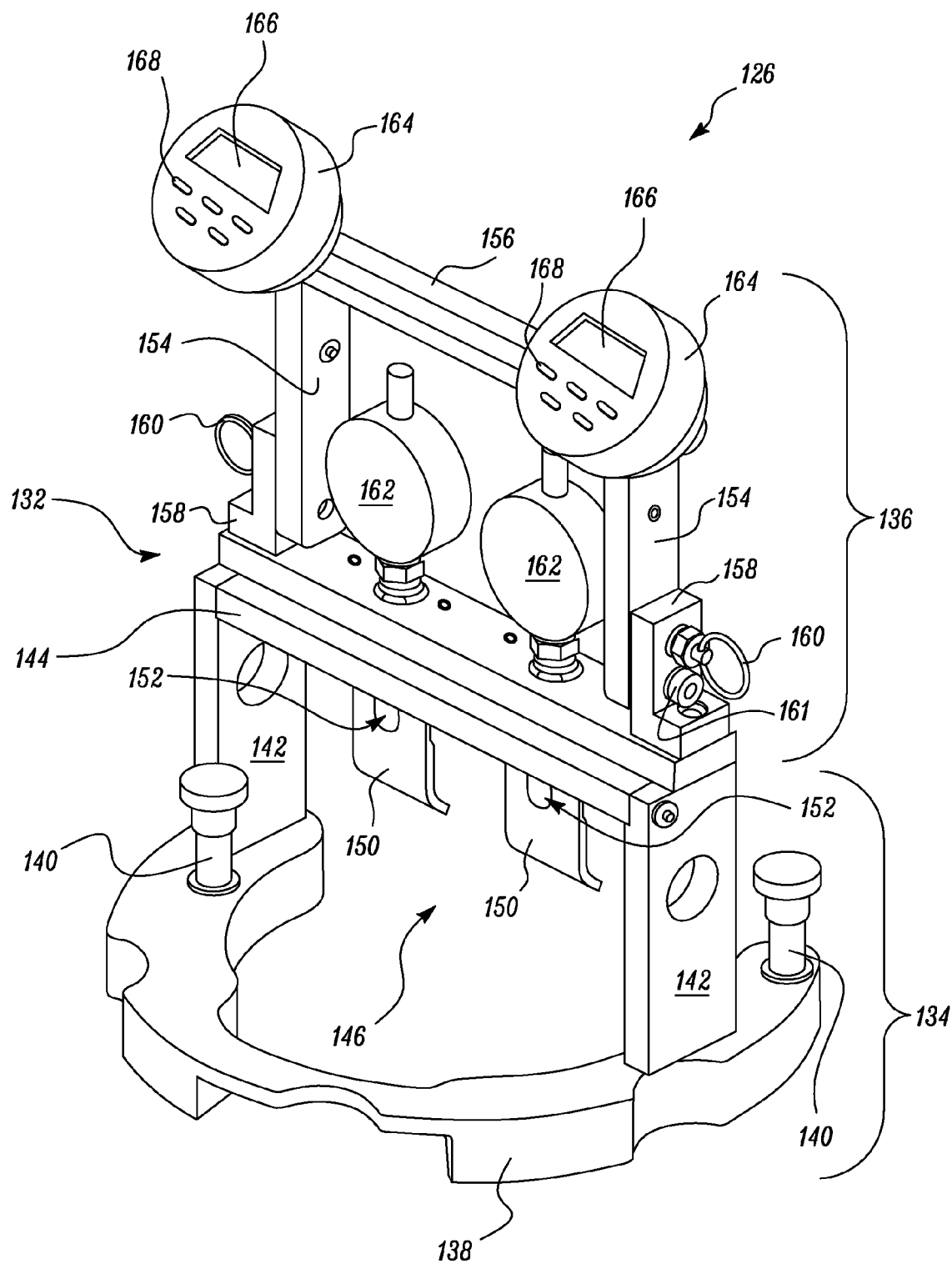
FIG. 2 is a perspective view of the valve lash adjustment tool.

FIG. 2 is a perspective view of the valve lash tool 126, according to one embodiment of the present disclosure. The valve lash tool 126 is configured to measure the valve lash. The measurement process of the valve lash using the valve lash tool 126 will be explained in detail later in this section. The valve lash tool 126 includes a frame assembly 132. The frame assembly 132 has an engine head attachment portion 134 and an instrument attachment portion 136.

The engine head attachment portion 134 includes a base frame 138. The base frame 138 has a semi-circular design with through holes provided at opposite ends of the base frame 138. The through holes of the base frame 138 are configured to receive mechanical fasteners therein. The mechanical fasteners are configured to removably affix the base frame 138 to the cylinder head 100 of the engine 102. The mechanical fasteners disclosed herein are embodied as thumb screws 140, so that the valve lash tool 126 can be easily assembled and dissembled from the cylinder head 100 of the engine 102 by maintenance personnel.

The engine head attachment portion 134 also includes a first pair of support members 142. The first pair of support members 142 is attached to and extends axially from the opposite ends of the base frame 138. The first pair of support members 142 may be attached to the base frame 138 by any known method, for example, welding. In the illustrated embodiment, the support members 142 have a rectangular shape. A horizontal frame member 144 is attached to an upper end of each of the support members 142. As shown in the accompanying figure, the horizontal frame member 144, the first pair of support members 142 and the base frame 138 define a space 146 therebetween. When the frame assembly 132 is mounted on the cylinder head 100, a part of the valve train 104 is configured to be received within this space 146 (see FIG. 3).

A gap setting gauge assembly is connected to the frame assembly 132. The gap setting gauge assembly is connected to a lower surface of the horizontal frame member 144. The gap setting gauge assembly includes at least one clip 150. In the illustrated embodiment, the gap setting gauge assembly includes a pair of spring loaded clips 150, associated with the rocker arms 112. The clips 150 include a first end and a second end. In one embodiment, the first end of the clip 150 has a U-shaped cut-out portion 152. The shape of cut-out is not restricted to U-shape, and other shapes of holes may also be used to provide the access for measuring probes of the position sensor 162 to pass therethrough. When the frame assembly 132 is mounted on the cylinder head 100, the U-shaped cut-out portion 152 is configured to engage with the rocker arm 112 and hold the rocker arm 112 in a maximum pivot position.

The frame assembly 132 also includes the instrument attachment portion 136 provided above the engine head attachment portion 134. The instrument attachment portion 136 includes a second pair of support members 154. The second pair of support members 154 of the instrument attachment portion 136 extends axially upwards from the horizontal frame member 144. The instrument attachment portion 136 also includes a horizontal bar 156 that joins with an upper end of each of the second pair of support members 154.

Figure 4:
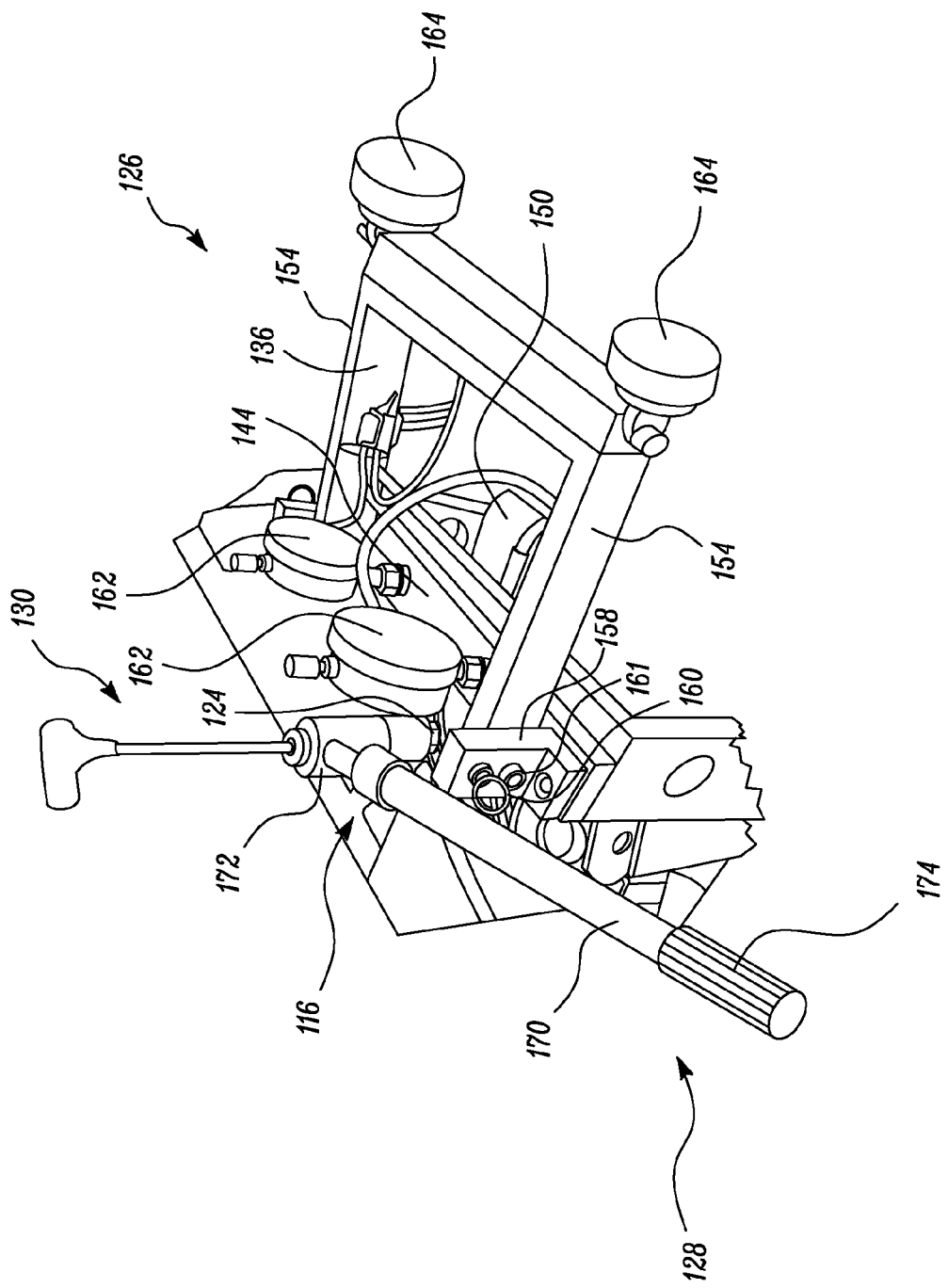
FIG. 4 is a perspective view showing a torque wrench and a hex key attached to an end of the rocker arm.

The instrument attachment portion 136 also includes a pair of L-shaped pieces 158. Each of the second pair of support members 154 is configured to be in contact with the L-shaped piece 158 and rotatably coupled to the engine head attachment portion 134, along the axis of a pair of hinge-pins 161. A locking mechanism is provided in order to hold the instrument attachment portion 136 parallel with the engine head attachment portion 134. The locking mechanism is embodied as pull pins 160 that pass through the L-shaped pieces 158. Referring to FIG. 4, on removal of the pull pins 160, the instrument attachment portion 136 is configured to pivot about the horizontal frame member 144 and collapse with respect to the engine head attachment portion 134. The rotation of the instrument attachment portion 136 creates a clearance so that the second end 116 of the rocker arm 112 may be accessed easily by the maintenance personnel.

The instrument attachment portion 136 is removably attached to the engine head attachment portion 134 via the L-shaped pieces 158. Alternatively, the instrument attachment portion 136 may also be attached to the engine head attachment portion 134 using any known fastening including, but not limited to, welding and brazing.

Referring to FIGS. 1, 2 and 4, the valve lash tool 126 also includes an instrument assembly. The instrument assembly is connected to the instrument attachment portion 136. The instrument assembly includes at least one position sensor 162. The position sensor 162 is attached to the horizontal frame member 144 of the engine head attachment portion 134. The position sensor 162 is configured to measure the valve lash of the valve train 104. In the illustrated embodiment, the instrument assembly includes a pair of position sensors 162. The position sensor 162 may be an absolute position sensor or a relative position sensor. The position sensor 162 may be a transducer. In one example, the position sensor 162 is a Linear Variable Differential Transformer (LVDT).

The position sensor 162 includes a probe (not shown), extending therefrom. When the position sensor 162 is attached to the horizontal frame member 144, the probe is movable and is configured to pass through the holes provided within the horizontal frame member 144. The probe of the position sensor 162 is configured to touch the valve stem 108 of the valve train 104. The position sensors 162 may also include an adjustment mechanism provided therewith. The adjustment mechanism is configured to change a length of the probe so that the position sensor 162 may extend into the rocker arm 112 and contact with the valve 106.

The instrument assembly also includes a display unit 164 associated with each of the position sensors 162. The display unit 164 may provide a digital readout of the measured valve lash thereon. The display unit 164 may include a display screen 166 and control buttons 168. The control buttons 168 may be configured to re-set the readings of the position sensor 162 on the display screen 166 when required. As shown in the accompanying figures, the display unit 164 may be attached to the second pair of support members 154. Alternatively, the display units 164 may be attached to any other location on the instrument attachment portion 136.

The valve lash adjustment system also includes the torque wrench 128. The torque wrench 128 is configured to apply a torque on the adjustment locknut 124 for the purpose of tightening or loosening the adjustment locknut 124. In one example, the torque wrench 128 may be a click-type torque wrench. The torque wrench 128 may be adjusted to a pre-determined torque, such that when the pre-determined amount of torque is applied on the adjustment locknut 124 a click sound is audible. This may indicate to the maintenance personnel that the desired torque has been applied and thereby avoid over-tightening or under-tightening of the adjustment locknut 124.

The torque wrench 128 is embodied as an elongate rod 170 with an adapter 172 provided at one end. The adapter 172 is configured to receive the adjustment locknut 124 present at the second end 116 of the rocker arm 112, during an adjustment of the valve lash. The torque wrench 128 also includes a gripping member 174 provided at another end. The gripping member 174 is configured to provide a grip to the personnel holding the torque wrench 128. The valve lash adjustment system additionally includes the hex key 130. The hex key 130 may have a T-shaped or an L-shaped configuration. The hex key 130 is configured to drive the adjustment screw of the rocker arm 112, while adjusting the valve lash.

The measurement and adjustment of the valve lash will now be explained in detail. Before starting the measurement process, a piston of the corresponding cylinder of the engine 102 for which the valve lash is being measured, is positioned at a top dead center. Further, a valve cover may be removed from the cylinder head 100 of the engine 102. Referring now to FIG. 1, the frame assembly 132 of the valve lash tool 126 may be aligned with a portion of the valve train 104 and mounted thereon. Using the thumb screws 140, the valve lash tool 126 is be affixed onto the cylinder head 100 of the engine 102 for holding the frame assembly 132 in place during the measurement of the valve lash.

Figure 3:
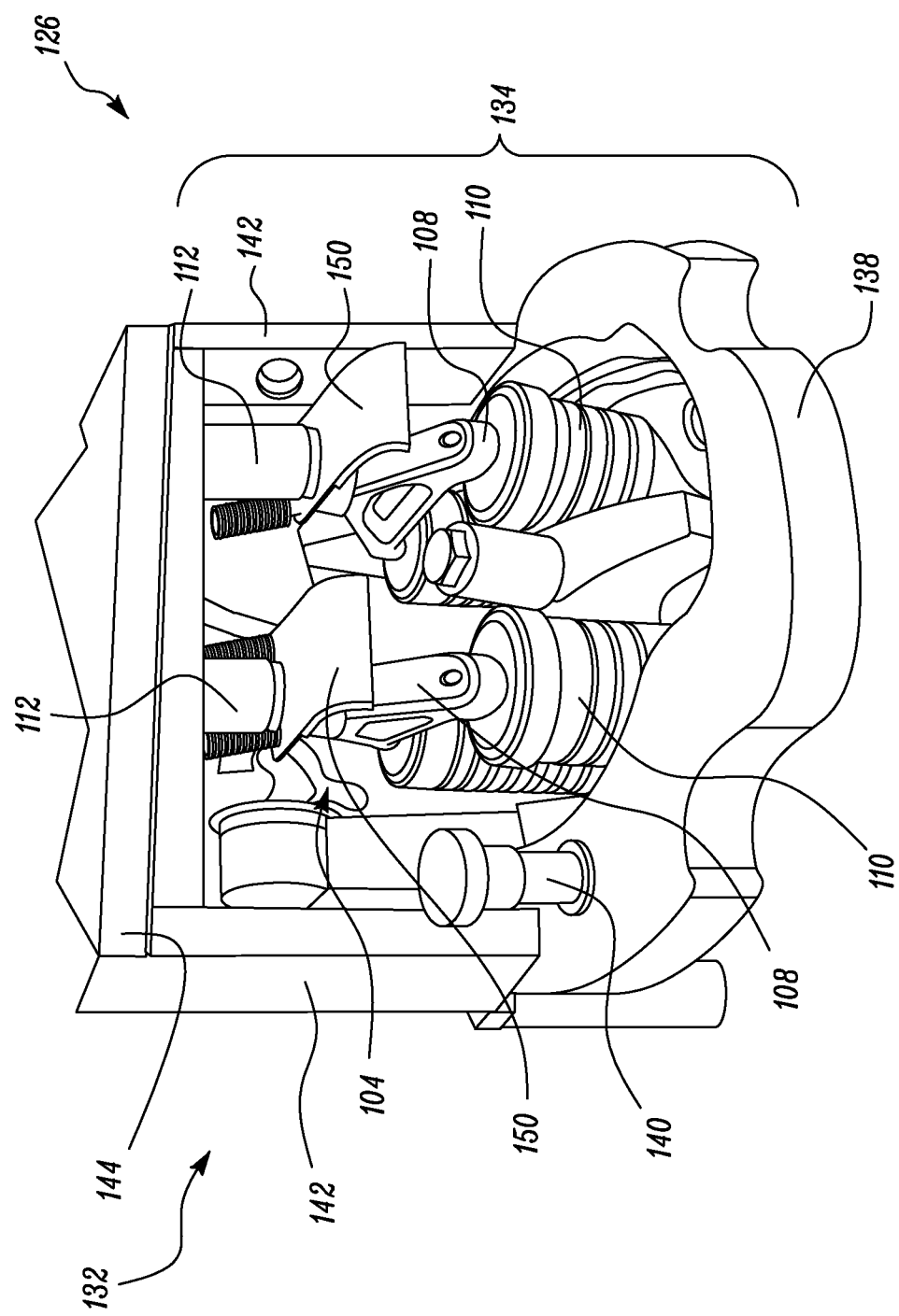
FIG. 3 is a detailed perspective view of a gap setting gauge assembly illustrated in the FIG. 2, of the valve lash adjustment tool.

The probe of the position sensor 162 is configured to extend into the rocker arm 112. Further, the length of the probe of the position sensors 162 may be adjusted for a full range of travel of the probe and also to ensure that the position sensor 162 does not shift during the measurement process. Referring to FIG. 3, during the measurement process, the personnel may pull the pair of clips 150 downwards, against a spring force of springs (not shown) associated therewith. The clips 150 are configured to firmly hold the rocker arm 112 between the clips 150 and the horizontal frame member 144, so that the rocker arm 112 does not shift during the measurement of the valve lash. The clips 150 are also configured to hold the rocker arm 112 to its maximum pivot position. After setting the position sensors 162 and the pair of clips 150, each of the display unit 164 is set to a zero read out. On activation, the position sensor 162 may determine the valve lash and display the valve lash on the display screen 166 of the display unit 164.

If the valve lash is greater or lesser than a predetermined value the personnel may adjust the valve lash using the torque wrench 128 and the hex key 130. The valve lash may be adjusted by loosening or tightening the adjustment screw and the adjustment locknut 124 positioned at the second end 116 of the rocker arm 112. In one example, the tightening or turning of the adjustment screw and the adjustment locknut 124 in a clockwise direction may cause the adjustment screw and the adjustment locknut 124 to reduce the valve lash. Whereas, the loosening or turning of the adjustment screw and the adjustment locknut 124 in a counter clockwise direction may cause the adjustment screw and the adjustment locknut 124 to increase the valve lash. The personnel may accordingly tighten or loosen the adjustment screw and the adjustment locknut 124 based on the desired value of the valve lash measured and displayed by the instrument assembly. It should be noted that for other rocker arm configurations which pivot at a center of the two ends of the rocker arm, the affect of the adjustment may be opposite to that described above.

Referring to FIG. 4, the personnel may initially remove the pull pins 160 associated with the second pair of support members 154, thereby causing the instrument attachment portion 136 of the valve lash tool 126 to pivot and collapse with respect to the engine head attachment portion 134. Further, a combined usage of the torque wrench 128 and the hex key 130 may be used to adjust the valve lash. As shown in accompanying figures, the torque wrench 128 may be affixed to the second end 116 of the rocker arm 112. Further, the adapter 172 of the torque wrench 128 may be affixed to the adjustment locknut 124. As the torque wrench 128 is preset to a torque value, the personnel tightens the torque wrench 128 till the audible click, which notifies the personnel that the adjustment locknut 124 is sufficiently tightened. Further, the hex key 130 may be inserted through the adapter 172 for the tightening of the adjustment screw. After adjustment of the valve lash, the measurement process of the valve lash described above may be repeated to check whether the valve lash is set to the desired value. The valve lash tool 126 may then be detached from the cylinder head 100 by unscrewing the thumb screws 140.

INDUSTRIAL APPLICABILITY

The valve lash associated with the rocker arm and the valve of the valve train may reset during the operation of the engine, on account of various reasons, one of which may include the thermal expansion of the engine mating parts. The reduction in the valve lash may lead to an improper seating of the valves. The increase in the valve lash may cause valve train noise, and also affect load on the valves and valve train components. It is therefore desirable to set the valve lash to an optimum value. Known processes to set the valve lash are laborious and prone to errors, due to accessibility and repeatability issues on engine valves.

The present disclosure relates to the valve lash adjustment system including the valve lash tool 126, the torque wrench 128 and the hex key 130. The valve lash tool 126 disclosed herein is less susceptible to errors and may provide the reading of the valve lash with improved accuracy. Further, the valve lash tool 126 can be easily installed and accessed by the personnel. The rotational movement of the instrument attachment portion 136 with respect to the engine attachment portion 134 may be helpful when working on large engines, such as, engines used in marine, or genset applications. These engines are usually more than 6 feet tall and may require a step or ladder for taking measurements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A valve lash adjustment system for setting a valve to a rocker arm clearance for a valve train associated with a particular combustion cylinder for an engine, the valve lash adjustment system comprising:

a frame assembly including an engine head attachment portion and an instrument attachment portion, the engine head attachment portion being removably attachable to the engine and the instrument attachment portion being selectively positionable relative to the engine head attachment portion of the frame assembly;

an instrument assembly including at least one position sensor and at least one display unit, the at least one position sensor being attached to the engine head attachment portion of the frame assembly and the at least one display unit being attached to the instrument attachment portion of the frame assembly; and a gap setting gauge assembly having a clip member, the clip member having first and second ends, the first end of the clip being configured to be selectively disposed between the valve and the rocker arm, the second end of the clip member being resiliently attached to the frame assembly, wherein the frame assembly, the instrument assembly and the gap setting gauge assembly defining one detachable unit structured and arranged to attach to a head of the engine, the instrument attachment portion of the frame assembly being structured and arranged to be selectively moveable in response to a readout event of the at least one display unit.

2. A kit for measuring and adjusting a valve lash of a valve train associated with a combustion engine, the kit comprising:

a valve lash tool configured to be connected to a first end of a rocker arm of the valve train, the valve lash tool comprising:

a frame assembly including:

an engine head attachment portion comprising:

a base frame having mechanical fasteners thereon, the mechanical fasteners configured to removably affix the base frame to a head of the engine;

a first pair of support members extending axially from the base frame; and a horizontal frame member attached to the first pair of support members, wherein the horizontal frame member, the first pair of support members and the base frame define a space therebetween, such that the valve train is configured to be received into the space; and an instrument attachment portion attached to the engine head attachment portion, the instrument attachment portion configured to be selectively moveable with respect to the engine head attachment portion, the instrument attachment portion including a second pair of support members attached to the horizontal frame member and extending axially therefrom;

a gap setting gauge assembly connected to the frame assembly, the gap setting gauge assembly including at least one clip, wherein the at least one clip has a first end having a U-shaped cut-out portion, such that the first end is configured to be selectively disposed about the rocker arm; and an instrument assembly connected to the frame assembly, the instrument assembly comprising:

at least one position sensor attached to the horizontal frame member of the engine head attachment portion, the at least one position sensor associated with the at least one clip, the at least one position sensor configured to contact with a valve present within the rocker arm; and at least one display unit attached to the second pair of support members of the instrument attachment portion, the at least one display unit associated with the at least one clip, wherein the at least one display unit is configured to provide a readout of the valve lash associated with the rocker arm;

a torque wrench configured to be attached to a second end of the rocker arm, the torque wrench having an adaptor thereon; and a hex key configured to be connected to the adaptor of the torque wrench, wherein the valve lash is adjusted based on a torque applied on the torque wrench and the hex key.

\* \* \* \* \*